United States Patent
Baer et al.

(10) Patent No.: US 10,077,509 B2
(45) Date of Patent: Sep. 18, 2018

(54) PRODUCTION OF MICRO- AND NANO-FIBERS BY CONTINUOUS MICROLAYER COEXTRUSION

(71) Applicant: Case Western Reserve University, Cleveland, OH (US)

(72) Inventors: Eric Baer, Cleveland Heights, OH (US); Deepak Langhe, Cleveland, OH (US); Jia Wang, Cleveland, OH (US)

(73) Assignee: Case Western Reserve University, Cleveland, OH (US)

( * ) Notice: Subject to any disclaimer, the term of this patent is extended or adjusted under 35 U.S.C. 154(b) by 636 days.

(21) Appl. No.: 14/394,234

(22) PCT Filed: Apr. 15, 2013

(86) PCT No.: PCT/US2013/036588
§ 371 (c)(1),
(2) Date: Oct. 13, 2014

(87) PCT Pub. No.: WO2013/155519
PCT Pub. Date: Oct. 17, 2013

(65) Prior Publication Data
US 2015/0064413 A1    Mar. 5, 2015

Related U.S. Application Data

(60) Provisional application No. 61/623,604, filed on Apr. 13, 2012.

(51) Int. Cl.
*D01D 5/42*   (2006.01)
*D02G 3/22*   (2006.01)
(Continued)

(52) U.S. Cl.
CPC ............ *D01D 5/42* (2013.01); *B29C 47/025* (2013.01); *B29C 47/06* (2013.01); *B29C 47/145* (2013.01);
(Continued)

(58) Field of Classification Search
CPC ... B29C 47/06; B29C 47/145; B32B 2250/02; B32B 2250/03; B32B 2250/24;
(Continued)

(56) References Cited

U.S. PATENT DOCUMENTS

| | | |
|---|---|---|
| 4,229,394 A | 10/1980 | Rasmussen |
| 5,094,793 A | 3/1992 | Schrenk |

(Continued)

FOREIGN PATENT DOCUMENTS

| | | |
|---|---|---|
| CN | 101553607 A | 10/2009 |
| EP | 2530188 A1 | 5/2012 |

(Continued)

OTHER PUBLICATIONS

First Chinese Office Action dated Sep. 1, 2015.
(Continued)

*Primary Examiner* — Camie S Thompson
(74) *Attorney, Agent, or Firm* — Tarolli, Sundheim, Covell & Tummino LLP

(57) ABSTRACT

A multilayered polymer composite film includes a first polymer material forming a polymer matrix and a second polymer material coextruded with the first polymer material. The second polymer material forms a plurality of fibers embedded within the polymer matrix. The fibers have a rectangular cross-section.

27 Claims, 14 Drawing Sheets

(51) Int. Cl.
- *B32B 27/08* (2006.01)
- *B32B 5/12* (2006.01)
- *D01F 6/66* (2006.01)
- *B29C 47/06* (2006.01)
- *D01D 5/253* (2006.01)
- *D01F 8/00* (2006.01)
- *B29C 47/02* (2006.01)
- *B29C 47/14* (2006.01)
- *B32B 27/20* (2006.01)
- *B32B 27/30* (2006.01)
- *B32B 27/34* (2006.01)
- *B32B 27/36* (2006.01)

(52) U.S. Cl.
CPC ............ *B32B 5/12* (2013.01); *B32B 27/08* (2013.01); *B32B 27/20* (2013.01); *B32B 27/302* (2013.01); *B32B 27/34* (2013.01); *B32B 27/36* (2013.01); *D01D 5/253* (2013.01); *D01D 5/423* (2013.01); *D01F 6/66* (2013.01); *D01F 8/00* (2013.01); *D02G 3/22* (2013.01); *B32B 2250/02* (2013.01); *B32B 2250/03* (2013.01); *B32B 2250/24* (2013.01); *B32B 2250/40* (2013.01); *B32B 2262/02* (2013.01); *B32B 2262/0276* (2013.01); *B32B 2307/514* (2013.01); *B32B 2307/54* (2013.01); *B32B 2367/00* (2013.01); *B32B 2371/00* (2013.01); *B32B 2535/00* (2013.01); *D10B 2331/06* (2013.01); *D10B 2509/00* (2013.01); *Y10T 428/24752* (2015.01); *Y10T 428/2973* (2015.01)

(58) Field of Classification Search
CPC . B32B 2307/514; B32B 5/12; B32B 2250/40; B32B 2262/0276; D01D 5/253; D01D 5/423; Y10T 428/2973; Y10T 428/24752

USPC .................................................. 428/189, 397
See application file for complete search history.

(56) References Cited

U.S. PATENT DOCUMENTS

| | | |
|---|---|---|
| 2003/0031846 A1 | 2/2003 | Kumazawa et al. |
| 2004/0012118 A1 | 1/2004 | Perez et al. |
| 2006/0193578 A1* | 8/2006 | Ouderkirk .......... B29C 47/0004 385/115 |
| 2007/0230883 A1 | 10/2007 | Hart et al. |
| 2009/0104386 A1 | 4/2009 | Barrera et al. |
| 2009/0324911 A1 | 12/2009 | Li et al. |
| 2010/0233458 A1 | 9/2010 | Sun et al. |
| 2012/0077015 A1 | 3/2012 | Zhou et al. |

FOREIGN PATENT DOCUMENTS

| | | |
|---|---|---|
| GB | 1236097 A1 | 6/1971 |
| JP | S6065115 A | 4/1985 |
| WO | 9919131 A1 | 4/1999 |
| WO | 2011019408 A1 | 2/2011 |
| WO | 2011093331 A1 | 8/2011 |

OTHER PUBLICATIONS

Extended European Search Report dated Dec. 22, 2015.
Office Action for Chinese Application No. 201380019797.3, dated May 17, 2017.
Office Action for Chinese Patent Application No. 201380019797.3, dated Oct. 10, 2017.

* cited by examiner

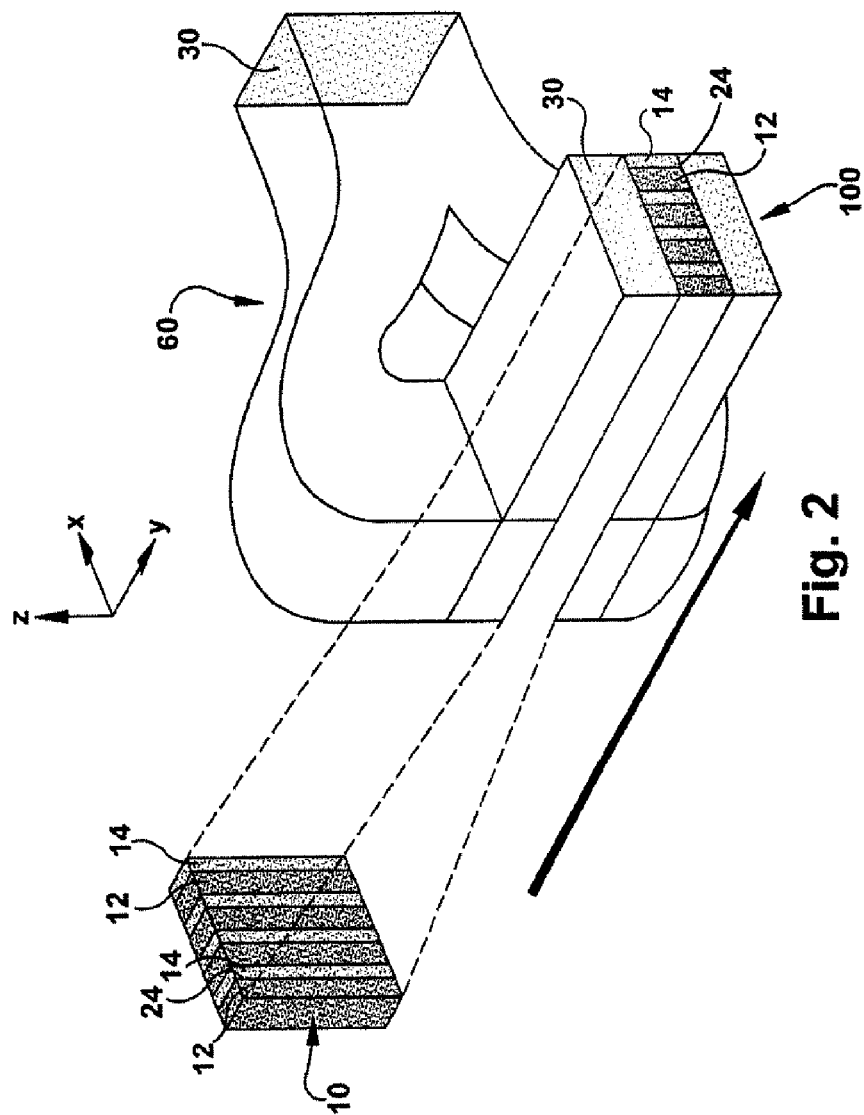

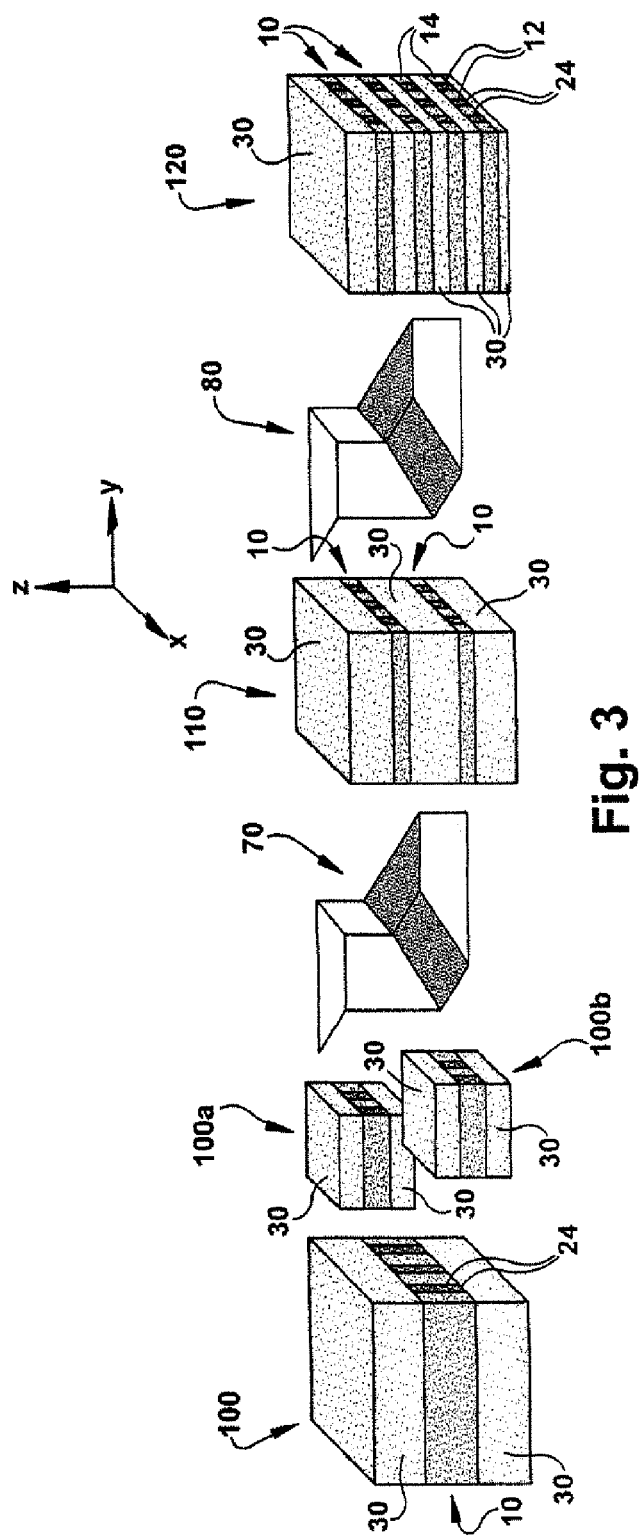

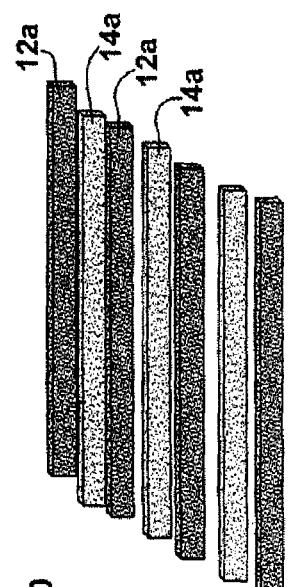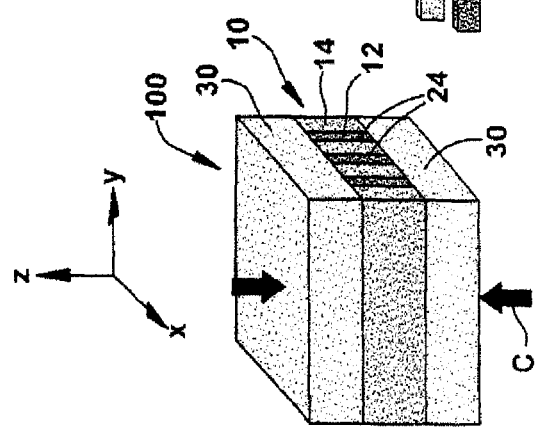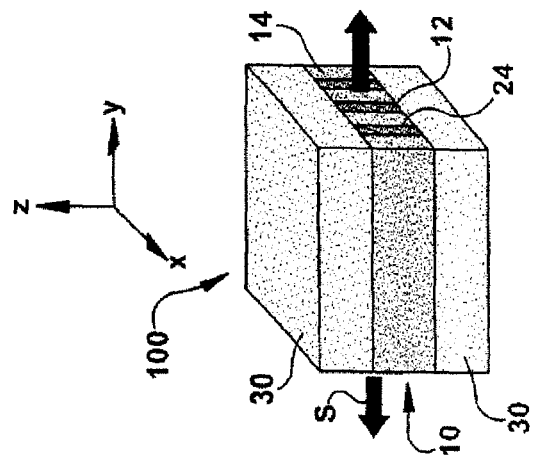

Figure 6 Fiber-based substrate made from polyethylene oxide (PEO) / polycaprolactone (PCL) vertical layered samples with a composition of 90/10. (a) and (b) SEM images at the magnification of 2300 and 9000. (c) Fiber width and thickness distribution.

FIGURE 11
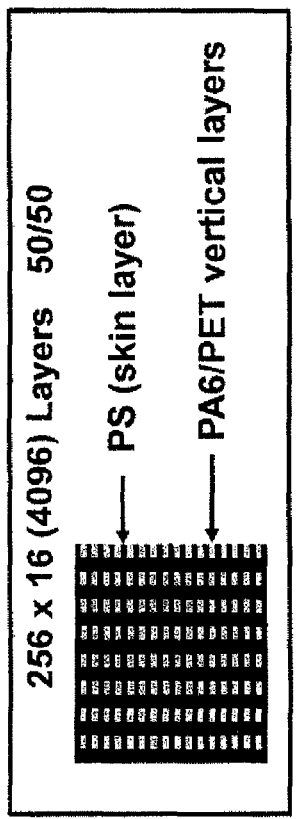
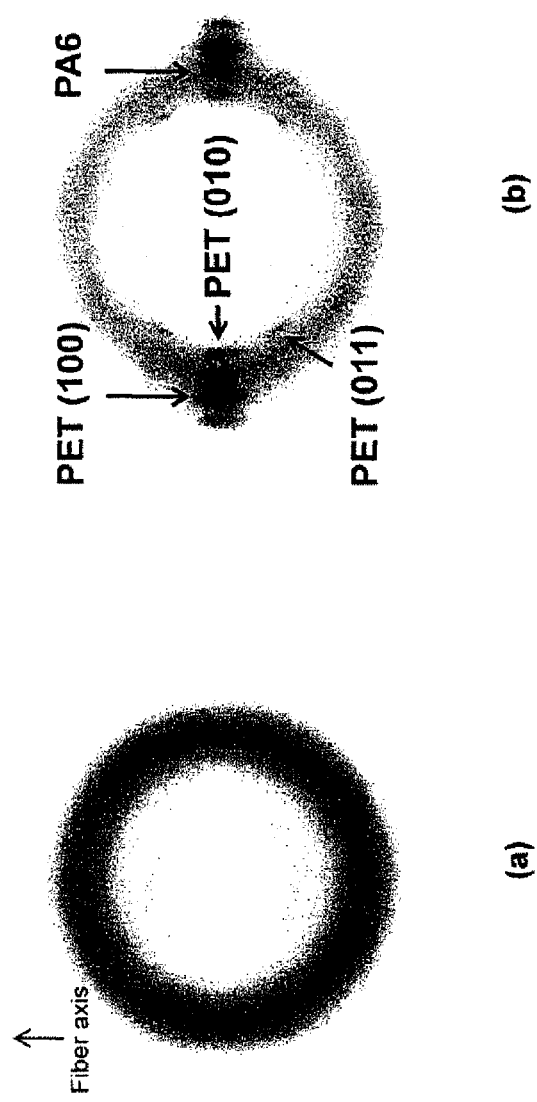
X-ray pattern of PA6/PET fibers (a) before and (b) after orientation.

Mechanical Properties of PA6/PET Fiber strand with and without Orientation

US 10,077,509 B2

PRODUCTION OF MICRO- AND NANO-FIBERS BY CONTINUOUS MICROLAYER COEXTRUSION

RELATED APPLICATIONS

This application claims the benefit of U.S. Provisional Application Ser. No. 61/623,604, filed Apr. 13, 2012, the subject matter of which is incorporated herein in its entirety.

TECHNICAL FIELD

The invention relates to polymers and, in particular, relates to coextruded, multilayered polymer films that are separated to form scaffolds as well as microlayer and nano-fibers.

BACKGROUND

Polymer fibers can be used in different applications, such as membranes and reinforcing materials. Previously employed methods to produce these fibers include electrospinning of a polymer solution or melt. More specifically, the fibers were obtained by electrospinning the polymer out of solution or the melt under high voltage. The use of this approach, however, is limited in that the proper solvents must be found and high voltage must be used, which results in high capital costs for production. Furthermore, the sizes, materials, and cross-sections of the fibers produced by electrospinning are limited. Therefore, there is a need in the art for a process of producing polymer fibers that allows for a wide range of fiber compositions at a reduced cost.

SUMMARY OF THE INVENTION

In accordance with the present invention, a multilayered polymer composite film includes a first polymer material forming a polymer matrix and a second polymer material coextruded with the first polymer material. The second polymer material forms a plurality of fibers embedded within the polymer matrix. The fibers have a rectangular cross-section.

In accordance with another aspect of the invention, a method for producing polymer fibers includes coextruding a first polymer material with a second polymer material to form a coextruded polymer film having discrete overlapping layers of polymeric material. The overlapped layers are multiplied to form a multilayered composite film. The first polymer material is separated from the second polymer material to form a plurality of first polymer material fibers having a rectangular cross-section.

In accordance with another aspect of the invention, a fiber is produced from a composite stream comprised of discrete overlapping layers of polymeric material, a pair of such discrete overlapping layers define a generally planar layer interface therebetween which lies generally in an x-y plane of an x-y-z coordinate system. The y-axis extends in the general direction of flow of the first composite stream, the x-axis extends transversely of the first composite stream and defines a transverse dimension of the layer interface, and the z-axis extends perpendicularly away from the planar layer interface in the thickness direction of the pair of discrete overlapping layers.

In some embodiments, the fiber can include a polymeric material extending longitudinally along the y-axis and can have a rectangular cross-section of about 0.1 µm to about 0.4 µm along the z-axis and about 0.3 µm to about 2.4 µm along the y-axis.

Other objects and advantages and a fuller understanding of the invention will be had from the following detailed description of the preferred embodiments and the accompanying drawings.

BRIEF DESCRIPTION OF THE DRAWINGS

FIG. 2 is a schematic illustration of coextruding skin layers onto the composite film of FIG. 1 to form a composite stream;

FIG. 3 is a schematic illustration of additional layer multiplying steps for the composite stream of FIG. 2;

FIG. 4A is a schematic illustration of stretching the composite stream of FIG. 2;

FIG. 4B is a schematic illustration of compressing the composite stream of FIG. 2;

FIG. 4C is a schematic illustration of delaminating the composite stream of FIG. 2;

FIGS. 11A and 11B are X-ray patterns of a PA6/PET fiber mixture sample before and after orientation;

DETAILED DESCRIPTION

Figure 1:
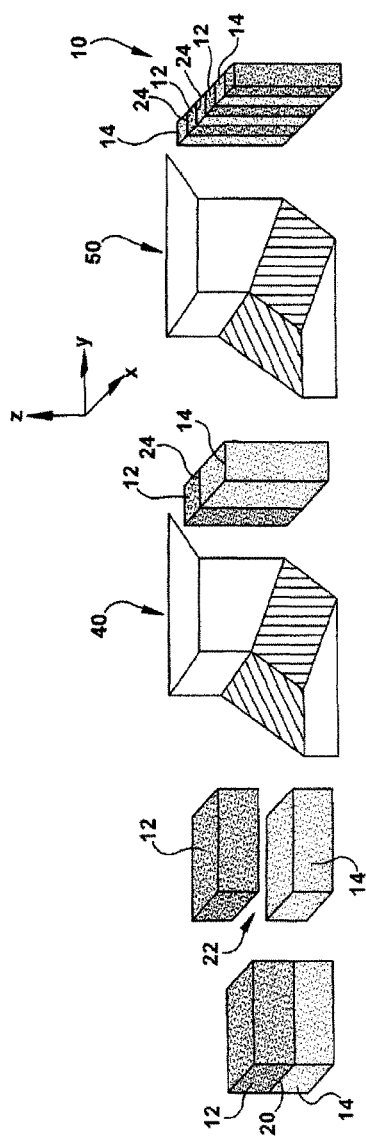
FIG. 1 is a schematic illustration of a coextrusion and layer multiplying process used to form a multilayered polymer composite film in accordance with an embodiment of the present invention.

The invention relates to polymers and, in particular, relates to coextruded, multilayered polymer films that are delaminated to form microlayer and nano-fibers. FIG. 1 illustrates a coextrusion and multilayering process used to form a multilayered polymer composite film 10. First, a first polymer layer 12 and a second polymer layer 14 are provided. The first layer 12 is formed from a first polymeric material (a) and the second polymer layer 14 is formed from a second polymer material (b) that is substantially immiscible with the first polymer material (a) when coextruded. It will be appreciated that one or more additional layers formed from the polymer materials (a) or (b) or a different polymer materials may be provided to produce the multilayered polymer composite film 10.

The term "polymer" or "polymeric material" as used in the present application denotes a material having a weight average molecular weight (Mw) of at least 5,000. Preferably the polymer is an organic polymeric material. The term "oligomer" or "oligomeric material" as used in the present application denotes a material with a weight average molecular weight of from 1,000 to less than 5,000. Such polymeric materials can be glassy, crystalline or elastomeric polymeric materials.

Examples of polymeric materials that can potentially be used for the first and second polymer materials (a), (b) include, but are not limited to, polyesters such as poly (ethylene terephthalate) (PET), poly(butylene terephthalate), polycaprolactone (PCL), and poly(ethylene naphthalate)polyethylene; naphthalate and isomers thereof such as 2,6-, 1,4-, 1,5-, 2,7-, and 2,3-polyethylene naphthalate; polyalkylene terephthalates such as polyethylene terephthalate, polybutylene terephthalate, and poly-1,4-cyclohexanedimethylene terephthalate; polyimides such as polyacrylic imides; polyetherimides; styrenic polymers such as atactic, isotactic and syndiotactic polystyrene, α-methyl-polystyrene, para-methyl-polystyrene; polycarbonates such as bisphenol-A-polycarbonate (PC); polyethylenes such as polyethyele oxide (PEO); poly(meth)acrylates such as poly (isobutyl methacrylate), poly(propyl methacrylate), poly (ethyl methacrylate), poly(methyl methacrylate), poly(butyl acrylate) and poly(methyl acrylate) (the term "(meth)acrylate" is used herein to denote acrylate or methacrylate); cellulose derivatives such as ethyl cellulose, cellulose acetate, cellulose propionate, cellulose acetate butyrate, and cellulose nitrate; polyalkylene polymers such as polyethylene, polypropylene, polybutylene, polyisobutylene, and poly (4-methyl)pentene; fluorinated polymers such as perfluoroalkoxy resins, polytetrafluoroethylene, fluorinated ethylene-propylene copolymers, polyvinylidene fluoride, and polychlorotrifluoroethylene and copolymers thereof; chlorinated polymers such as polydichlorostyrene, polyvinylidene chloride and polyvinylchloride; polysulfones; polyethersulfones; polyacrylonitrile; polyamides such as nylon, nylon 6,6, polycaprolactam, and polyamide 6 (PA6); polyvinylacetate; polyether-amides. Also suitable are copolymers such as styrene-acrylonitrile copolymer (SAN), preferably containing between 10 and 50 wt %, preferably between 20 and 40 wt %, acrylonitrile, styrene-ethylene copolymer; and poly(ethylene-1,4-cyclohex-ylenedimethylene terephthalate) (PETG). Additional polymeric materials include an acrylic rubber; isoprene (IR); isobutylene-isoprene (IIR); butadiene rubber (BR); butadiene-styrene-vinyl pyridine (PSBR); butyl rubber; polyethylene; chloroprene (CR); epichlorohydrin rubber; ethylene-propylene (EPM); ethylene-propylene-diene (EPDM); nitrile-butadiene (NBR); polyisoprene; silicon rubber; styrene-butadiene (SBR); and urethane rubber. Additional polymeric materials include block or graft copolymers. In one instance, the polymeric materials used to form the layers 12, 14 may constitute substantially immiscible thermoplastics.

In addition, each individual layer 12, 14 may include blends of two or more of the above-described polymers or copolymers, preferably the components of the blend are substantially miscible with one another yet still maintaining substantial immiscibility between the layers 12, 14. Preferred polymeric materials include PCL paired with PEO, PA6 paired with PET, and copolymers thereof. The components comprising the layers 12, 14 in accordance with the present invention can include organic or inorganic materials, including nanoparticulate materials, designed, for example, to modify the mechanical properties of the components, e.g., tensile strength. It will be appreciated that potentially any extrudable polymer can be used as the first polymer material (a) and the second polymer material (b) so long as upon coextrusion such polymer materials (a), (b) are substantially immiscible and form discrete layers or polymer regions.

Referring to FIG. 1, the layers 12, 14 are co-extruded and multiplied in order to form the multilayered polymer composite film 10. In particular, a pair of dies 40, 50 is used to coextrude and multiply the layers 12, 14. Each layer 12, 14 initially extends in the y-direction of an x-y-z coordinate system. The y-direction defines the length of the layers 12, 14 and extends in the general direction of flow of material through the dies 40, 50. The x-direction extends transverse, e.g., perpendicular, to the y-direction and defines the width of the layers 12, 14. The z-direction extends transverse, e.g., perpendicular, to both the x-direction and the y-direction and defines the height or thickness of the layers 12, 14.

The layers 12, 14 are initially stacked in the z-direction and define an interface 20 therebetween that resides in the x-y plane. As the layers 12, 14 approach the first die 40 they are separated from one another along the z-axis to define a space 22 therebetween. The layers 12, 14 are then re-oriented as they pass through the first die 40. More specifically, the first die 40 varies the aspect ratio of each layer 12, 14 such that the layers 12, 14 extend longitudinally in the z-direction. The layers 12, 14 are also brought closer to one another until they engage or abut one another along an interface 24 that resides in the y-z plane. Alternatively, the layers 12, 14 are coextruded as they pass through the die 40 such that the interface 24 includes chemical bonds (not shown).

The layers 12, 14 then enter the second die 50 where layer multiplication occurs. The second die 50 may constitute a single die or several dies which process the layers 12, 14 in succession (not shown). Each layer 12, 14 is multiplied in the second die 50 to produce a plurality of first layers 12 and a plurality of second layers 14 that alternate with one another to form the multilayered polymer composite film 10. Each pair of layers 12, 14 includes the interface 24 that resides in the y-z plane. The layers 12, 14 are connected to one another generally along the x-axis to form a series of discrete, alternating layers 12, 14 of polymer material (a), (b). Although three of each layer 12 and 14 are illustrated it will be appreciated that the multilayered polymer composite film 10 may include, for example, up to thousands of each layer 12, 14.

Referring to FIG. 2, once the multilayered polymer composite film 10 is formed a detachable skin or surface layer 30 is applied to the top and bottom of the film 10 such that the film 10. In particular, the multilayered polymer composite film 10 enters a die 60 where the film 10 is sandwiched between two skin layers 30 along the z-axis to form a first composite stream 100. The skin layer 30 may be formed from the first polymer material (a), the second polymer material (b) or a third polymer material (c) different from the first and second polymer materials (a), (b). One or both of the skin layers 30 may, however, be omitted (not shown).

Referring to FIG. 3, the first composite stream 100 is divided along the x-axis into a plurality of branch streams 100*a*, 100*b* and processed through a pair of multiplying dies 70, 80. In the die 70, the streams 100*a*, 100*b* are stacked in the z-direction, stretched in both the x-direction and the y-direction, and recombined to form a second composite stream 110 that includes a plurality of multilayered films 10 alternating with skin layers 30. Biaxial stretching of the branch streams 100*a*, 100*b* in the x-direction and y-direction may be symmetric or asymmetric.

The die 80 performs similar modifications to the second composite stream 110 that the die 70 performed on the branch streams 100*a*, 100*b*. In particular, in the die 80 the second composite stream 110 is divided along the x-axis, stacked along the z-axis, stretched in both the x-direction and the y-direction, and stacked in the z-direction to form a third composite stream 120. The third composite stream 120 shown in FIG. 3 includes four multilayered composite films 10 that alternate with five skin layers 30, although more or fewer of the films 10 and/or layers 30 may be present in the third composite stream 120. Regardless, the third composite stream 120 includes a plurality of layer interfaces 24 between the layers 12, 14.

By changing the volumetric flow rate of the polymer layers 12, 14 through the dies 70, 80, the thickness of both the polymer layers 12, 14 and each multilayered polymer film 10 in the z-direction can be precisely controlled. Additionally, by using detachable skin layers 30 and multiplying the composite streams 100, 110 within the dies 70, 80, the number and dimensions of the layers 12, 14, the multilayered polymer film 10, and the branch streams 100*a*, 100*b* in the x, y, and z-directions can be controlled.

Referring to FIGS. 4A and 4B, the first composite structure 100 may be mechanically processed by, for example, at least one of stretching (FIG. 4A), compression (FIG. 4B), and ball-mill grinding (not shown). As shown, the composite stream 100 is stretched in the y-direction as indicated generally by the arrow "S", although the composite stream 100 may alternatively be stretched in the x-direction (not shown). FIG. 4B illustrates the composite stream 100 being compressed in the z-direction as indicated generally by the arrow "C". The degree of stretching and/or compression will depend on the application in which the multilayered polymer film 10 is to be used. The ratio of y-directional stretching to z-direction compression may be inversely proportional or disproportional.

Referring to FIG. 4C, the first composite stream 100 can be further processed to cause the components 12, 14, 30 thereof to separate or delaminate from one another and form a plurality of fibers or fiber-like structures 12*a*, 14*a* from the layers 12, 14. The removed skin layers 30 are discarded. In one instance, the layers 12, 14, 30 are mechanically separated by high pressure water jets (not shown). In particular, two opposing ends of the composite stream 100 can be fixed and water jets with a nozzle pressure of no less than about 2000 psi can be applied to the composite stream 100 to separate the layers 12, 14, 30 completely, thereby forming the nano-fibers 12*a*, 14*a*. More specifically, applying high pressure water to the first composite stream 100 removes the interfaces 24 between the layers 12, 14, i.e., delaminates the multilayered polymer composite films 10, to form the fibers 12*a* and 14*a*. Although delamination of the first composite stream 100 is illustrated, it will be appreciated that the multilayered polymer composite film 10, the second composite stream 110 or the third composite stream 120 may likewise be delaminated via high pressure water or the like to form the fibers 12*a*, 14*a*.

Alternatively, the polymer material (a) or (b) of one of the layers 12, 14 is selected to be soluble in a particular solvent while the other polymer material (a) or (b) is selected to be insoluble in that solvent. Accordingly, immersing the composite stream 100 in the solvent separates the layers 12, 14 by wholly removing, e.g., dissolving, not only the interfaces 24 between the layers 12, 14 but removed the soluble layers 12 or 14 entirely. The insoluble layers 12 or 14 are therefore left behind following solvent immersion. The same solvent or a different solvent may be used to dissolve the skin layers 30, when present. The remaining soluble layers 12 or 14 form the fibers 12*a* or 14*a*. In one instance, the solvent is water but in any case no organic solvent is used.

Whether the fibers 12*a* and/or 14*a* are formed by mechanically separating the layers 12 or 14 or dissolving one of the layers 12 or 14 with a solvent, the nano-fibers 12*a* and/or 14*a* produced by the described coextrusion process have rectangular cross-sections rather than the conventional, round cross-sections formed by electrospinning. These rectangular or ribbon-like nano-fibers 12*a* or 14*a* have a larger surface area-to-volume ratio than round fibers developed using spinning methods. Regardless of the method of separation enlisted, the nano-fibers 12*a* and/or 14*a* will stretch, oscillate, and separate from each other at the interface 24. Furthermore, due to the aforementioned mechanical processing techniques of FIGS. 4A and 4B, the exact cross-sectional dimensions of the rectangular fibers 12*a* and/or 14*a* can be precisely controlled. For example, the rectangular fibers 12*a* and/or 14*a* can be made smaller and strengthened via mechanical processing.

Although multiple separation techniques are described for forming the rectangular fibers 12*a* and/or 14*a*, one having ordinary skill in the art will understand that the multilayered polymer composite film 10 or the composite streams 100, 110, 120 may alternatively be left intact. In this instance, and referring back to FIG. 3, the rectangular polymer fibers constitute the layers 12 and/or 14 embedded in the surrounding polymer matrix of the components 12, 14, and 30 (where present). The embedded layers 12, 14 exhibit substantially the same properties as the separated fibers 12*a*, 14*a*. In any case, the fibers 12, 12*a*, 14, 14*a* may be on the microscale or nanoscale in accordance with the present invention.

Due to the construction of the first composite stream 100 and the fixed sizes of the dies 40-80, the composition of the vertical layers 12, 14 and surface layers 30 is proportional to the ratio of the height in the z-direction of a vertical layer 12, 14 section to that of a surface layer 30 section. Therefore, if the layer 12 (or 14) is selected to form the rectangular fibers 12*a* (or 14*a*), the thickness and height of the final fibers 12*a* (or 14*a*) can be adjusted by changing the ratio of the amount of the layers 12, 14 as well as the amount of surface layer 30. For example, increasing the percentage of the amount of the material (b) of the layers 14 relative to the amount of the material (a) of the layers 12 and/or increasing the amount of the material of the surface layers 30 results in smaller rectangular fibers 12*a*. Alternatively, one or more of the dies 40-80 may be altered to produce nanofibers 12, 12*a*, 14, 14*a* having a size and rectangular cross-section commensurate with the desired application. In one instance, one or more of the dies 40-80 could be modified to have a slit or square die construction to embed the fibers 12, 12a, 14, 14a within the surface layers 30.

The method of the present invention is advantageous in that it can produce polymer nano-fibers 12, 12a, 14, 14a made of more than one material, which was previously unattainable using single-shot extrusion. The method also allows for the use of any polymers that can be melt-processed to produce fibers 12, 12a, 14, 14a, in contrast to conventional electrospinning processes that are more confined in material selection. Also, the method of the present invention does not involve using costly organic solvents or high voltage compared to electrospinning.

The multilayered polymer film 10 of the present invention is advantageous for several reasons. The novel, flexible processing technology can be tailored to produce vertically layered films 10 with designer layer/fiber thickness distributions. For example, the relative material compositions of the polymers (a), (b) of the layers 12, 14 can be varied with great flexibility to produce rectangular polymer fibers 12, 12a, 14, 14a with highly variable constructions, e.g., 50/50, 30/80, 80/30, etc. The rectangular polymer fibers 12, 12a, 14, 14a of the present invention can be highly oriented and strengthened by post-extrusion orienting. Furthermore, a wide magnitude of layer 12, 14 thicknesses in the z-direction is achievable from a few microns down to tens of nanometers depending on the particular application. Moreover, the process of the present invention allows for the production of extremely high-aspect ratio fibers 12, 12a, 14, 14a. The microlayer and nanolayer coextrusion process uses industrially scalable processing methods and post-extrusion techniques capable of producing strengthened and commercially viable scale products having advantageous polymer fibers 12, 12a, 14, 14a.

The multilayered polymer film 10 of the present invention can produce rectangular fibers 12, 12a, 14, 14a for use in a number of applications. For example, the polymer film 10 can be used to produce polymer nano-fiber scaffolds from the separated or delaminated fibers 12a, 14a. Nano-fiber scaffolds can advantageously be used in tissue engineering applications because such scaffolds have high surface area and high aspect ratio fibers 12a, 14a, which allows for improved cell growth.

The mechanical properties of the scaffold can also be improved by depositing a static electric charge on the surface of the nano-fibers 12, 12a, 14, 14a. The fibers 12, 12a, 14, 14a may then be attracted to a negatively charged target. The distance between the corona charges and fibers 12, 12a, 14, 14a, and that between the fibers 12, 12a, 14, 14a and the target can be carefully selected to make a scaffold with uniformly distributed fibers.

The multilayered polymer film 10 of the present invention can also be used to form membrane supports and/or membranes with the fibers 12, 12a, 14, 14a. For example, highly porous membrane supports as well as membranes can be produced by partially adhering the fibers 12a, 14a to one another using various techniques following delamination or separation. The membranes or membrane mats formed in this manner are useful in different processes such as filtration, desalination, and water purification. The porosity of the membrane supports can be controlled by altering the fiber 12a, 14a dimensions and/or alternating the layers 12, 14 of the composite film 10.

Moreover, using elastomers to form the polymer layers 12, 14 and, thus, to form the polymer fibers 12, 12a, 14, 14a produces membrane materials that are mechanically durable. Additionally, the membranes and fibers 12, 12a, 14, 14a of the present invention may be tailored for use in drug and agriculture applications where gas release and/or diffusion control through the membrane materials is desirable. Diffusion through the membrane supports or membrane can be controlled by modifying, for example, the dimensions of the fibers 12, 12a, 14, 14a, thereby controlling the pore size. Moreover, the membranes and fibers 12, 12a, 14, 14a may be used to produce woven and non-woven textiles as well as wound treatment materials.

Figure 5:
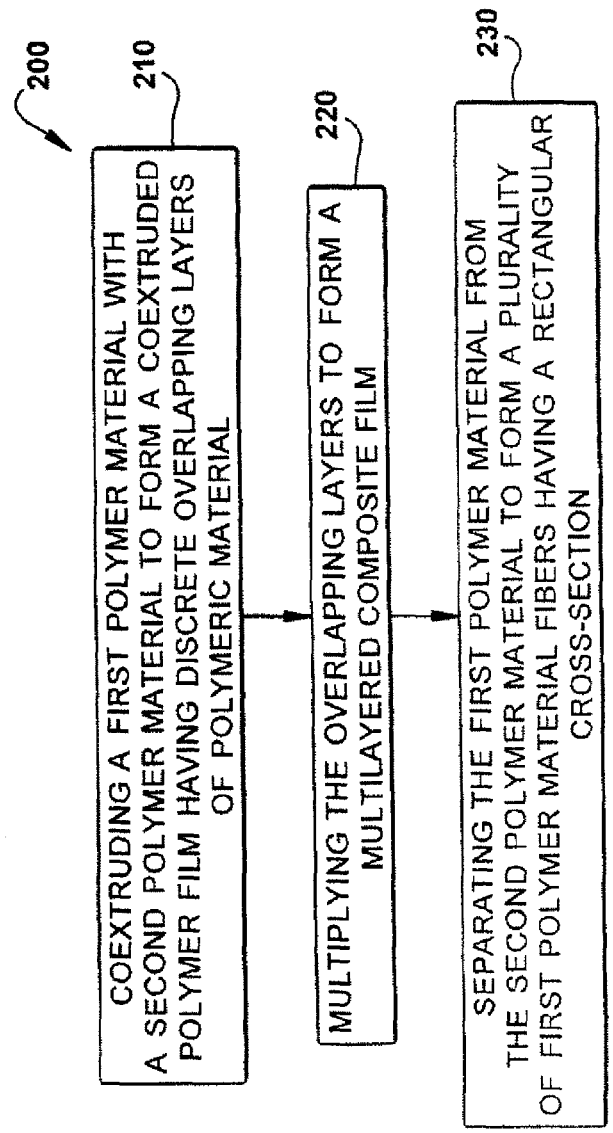
FIG. 5 is a flow chart illustrating a method of forming rectangular polymer fibers in accordance with the present invention.

FIG. 5 is a flow chart illustrating a method 200 of producing nanoscale fibers 12a or 14a in accordance with an aspect of the present invention. In step 210, a first polymer material is coextruded with a second polymer material to form a coextruded polymer film having discrete overlapping layers of polymeric material. In step 220, the overlapping layers are multiplied to form a multilayered composite film. In step 230, the first polymer material is separated from the second polymer material to form a plurality of polymer fibers having a rectangular cross-section.

Example 1

Figure 6:
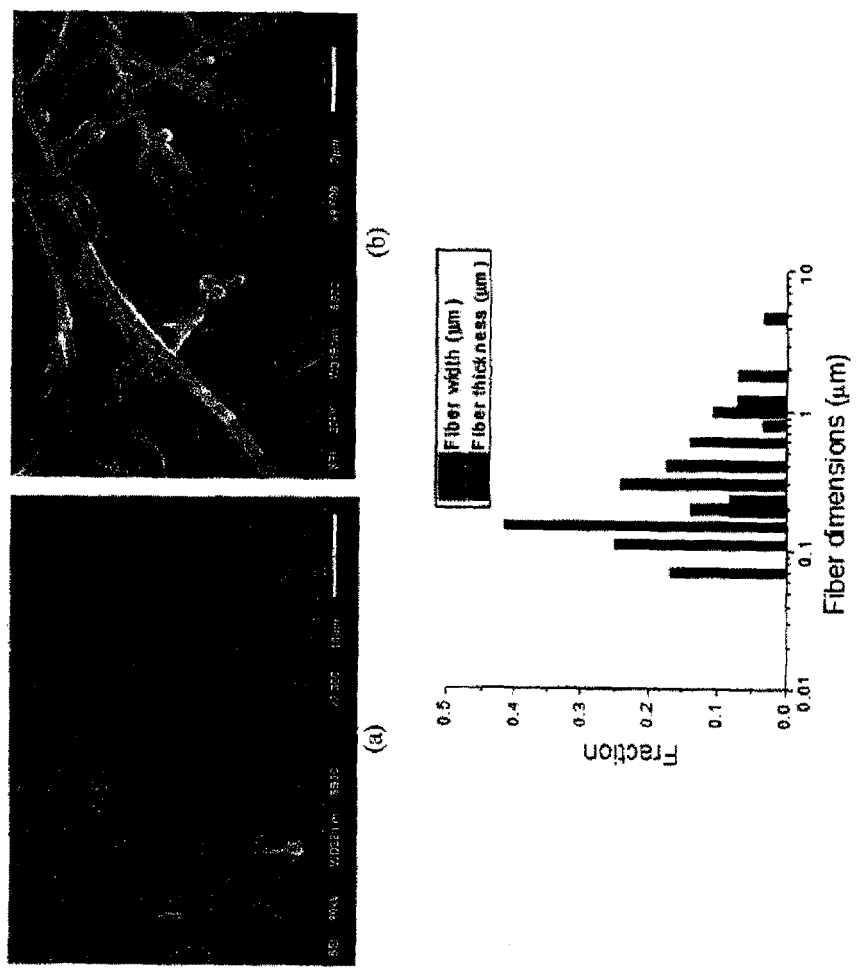
FIG. 6A is a SEM image of a fiber-based polyethylene oxide (PEO)/polycaprolactone (PCL) substrate at a magnification of 2300.
FIG. 6B is a SEM image of the fiber-based substrate of FIG. 6A at a magnification of 9000.
FIG. 6C is a graphical illustration relating fiber width and thickness to the fiber fraction, by volume, in the PEO/PCL substrate.

FIGS. 6A-C illustrate an example of a fiber-based substrate made using the aforementioned co-extrusion and delamination process. The fiber-based substrate was made from polyethylene oxide (PEO)/polycaprolactone (PCL) vertical layered samples with a composition of 90/10. More specifically, PEO was dissolved and washed away in water, leaving the PCL fibers integrated into a substrate. FIG. 6A illustrates a scanning electron microscope (SEM) image of the fiber-based substrate at a magnification of 2300. FIG. 6B illustrates a SEM image of the fiber-based substrate at a magnification of 9000. FIG. 6C graphically illustrates the correlation between the fiber width and thickness versus the fraction, by volume, of the fibers in the composite structure.

Example 2

FIGS. 7-10 illustrate an example of a PCL nano-fiber scaffold made using the aforementioned co-extrusion and separation process. In this example, PCL and PEO were co-extruded to produce tape consisting of 256×4 PCL/PEO vertical layers and 5 PEO skin or surface sections. The extrusion was done at 200° C. with the resulting extrudate constituting a structure of 512 PCL fibers embedded in a PEO matrix.

Figure 7:
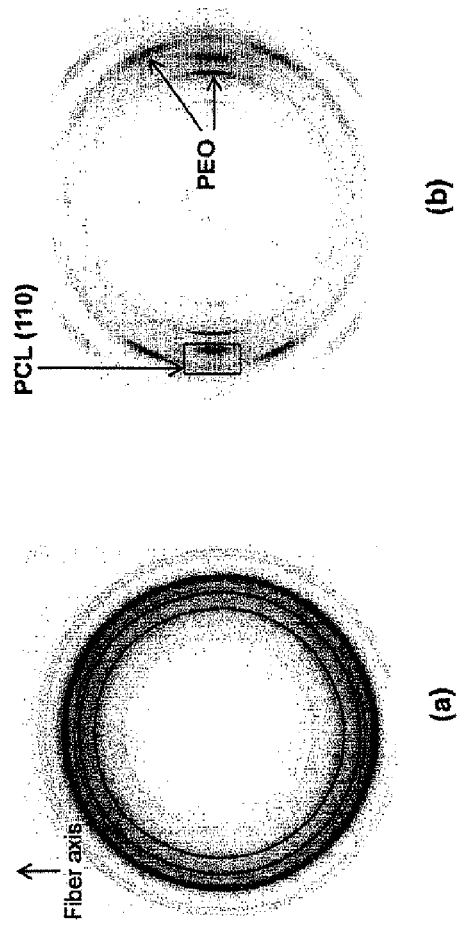
FIGS. 7A and 7B are X-ray patterns of a PCL/PEO fiber sample before and after orientation.
Figure 8:
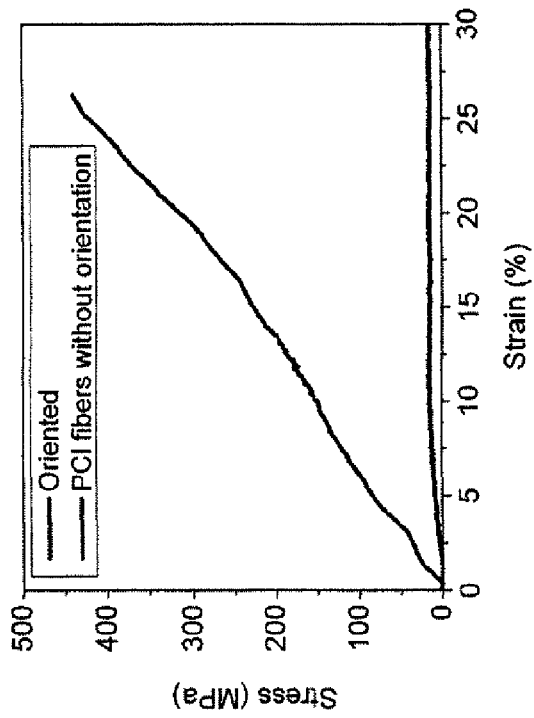
FIG. 8 is a graphical illustration depicting the mechanical properties of PCL fibers with and without orientation.

Subsequent orientation and separation techniques were used to produce highly oriented polymer fibers. The extruded strands were oriented at 50° C. at 100%/min in an Instron to a draw ration of 11.0. Referring to FIG. 7, x-ray patterns were obtained before and after orientation and illustrate highly oriented PCL fibers embedded in the PEO matrix. The tensile properties of the structure were tested before and after orientation, with the results being shown in FIG. 8. Orienting the PCL fibers increases the Young's Modulus of the PCL fibers to levels between about 300 MPa to about 2 GPa. The graph of FIG. 8 shows that the Young's Modulus increased from 200 MPA to about 1.7 GPa by orienting the PCL fibers. Accordingly, by orienting the nano-fibers, the mechanical properties were largely improved, which facilitates the potential for applications such as membranes and scaffolds.

Figure 9:
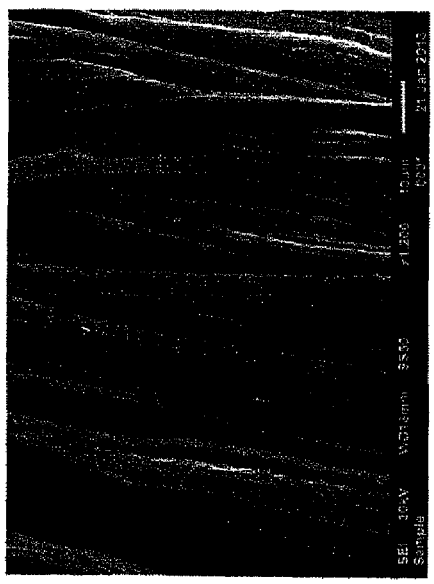
FIG. 9 is a SEM image of a PCL fiber following separation from a PEO matrix.
Figure 10:
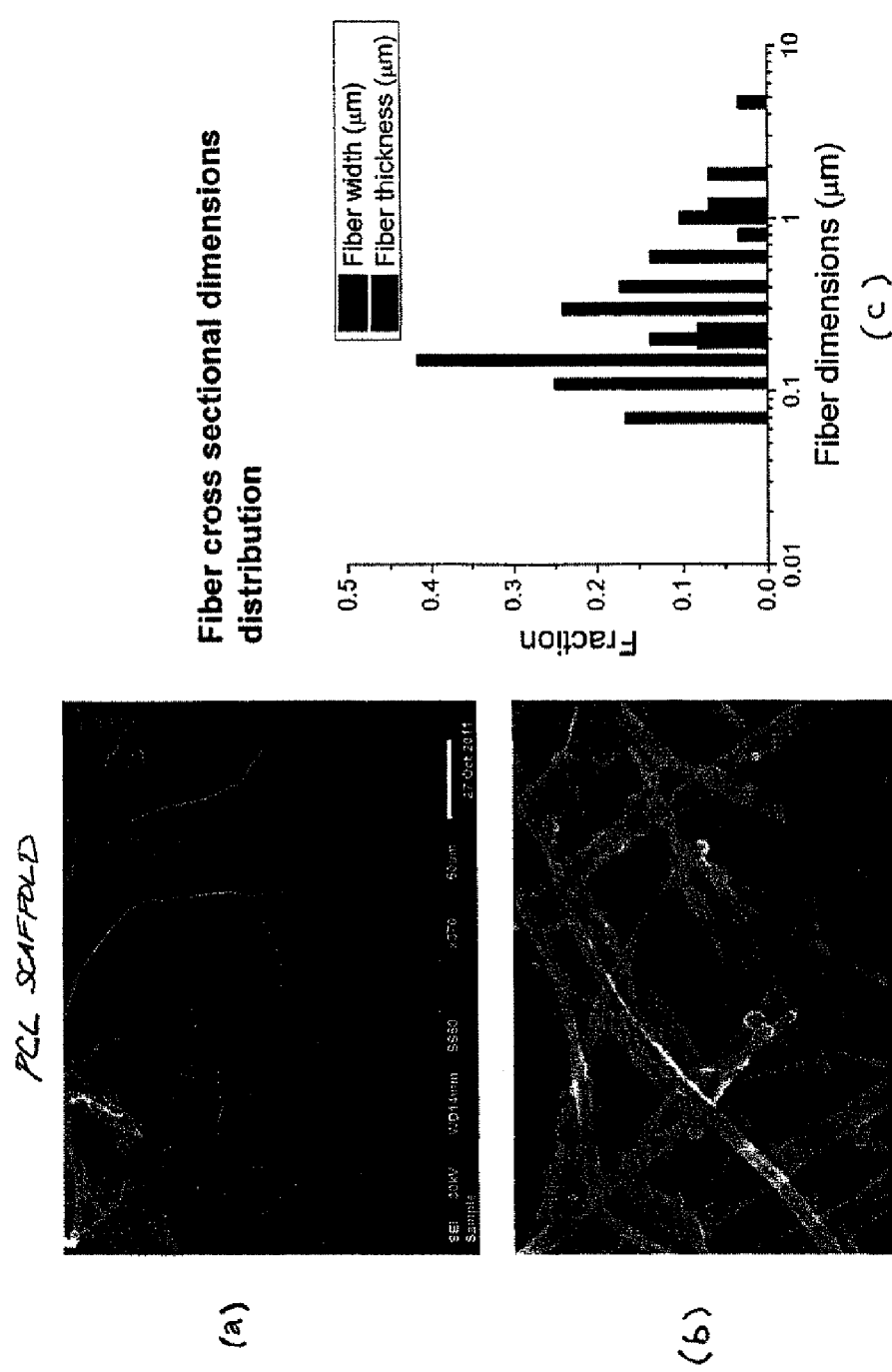
FIG. 10A is a SEM image of a PCL scaffold at a magnification of 380.
FIG. 10B is a SEM image of the PCL scaffold of FIG. 10A at a magnification of 9000.
FIG. 10C is a graphical illustration relating fiber width and thickness to the fiber fraction, by volume, in the PCL scaffold.

The structure was immersed in water for 15 hours at room temperature, which caused the soluble PEO matrix and surface layers to dissolve, leaving behind only rectangular PCL fibers (FIG. 9). The setup was kept stirring with a magnetic stirring bar, causing the fibers to become entangled and therefore stretch even more. A PCL nano-fiber scaffold was then made by spreading the stirred product on a piece of glass slide and evaporating any residual water. The final cross-sectional dimensions of the rectangular PCL fibers are about 0.1 µm to about 0.2 µm in the thickness or z-direction and about 0.3 µm to about 0.4 µm in the width or x-direction. SEM images of the PCL nano-fibers are shown in FIGS. 10A and 10B. FIG. 10C shows the fiber size distribution.

Example 3

FIGS. 11-14 illustrate an example of a PA6/PET nano-fiber scaffold made using the aforementioned co-extrusion and separation process. In this example, PA6 and PET were co-extruded to produce tape consisting of 256×16 PA6/PET (50/50) vertical layers and 16 PS skin or surface sections. Subsequent orientation and separation techniques were used to produce highly oriented polymer fibers. The extruded strands were oriented at 120° C. at 3000%/min in an Instron to a draw ration of 9.0.

Figure 12:
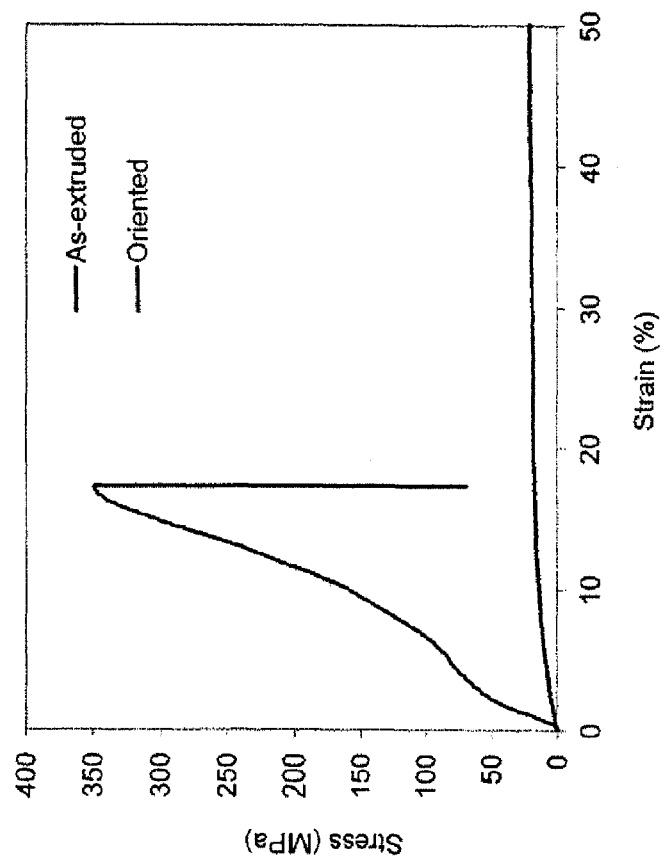
FIG. 12 is a graphical illustration depicting the mechanical properties of PA6/PET fibers with and without orientation.
Figure 13:
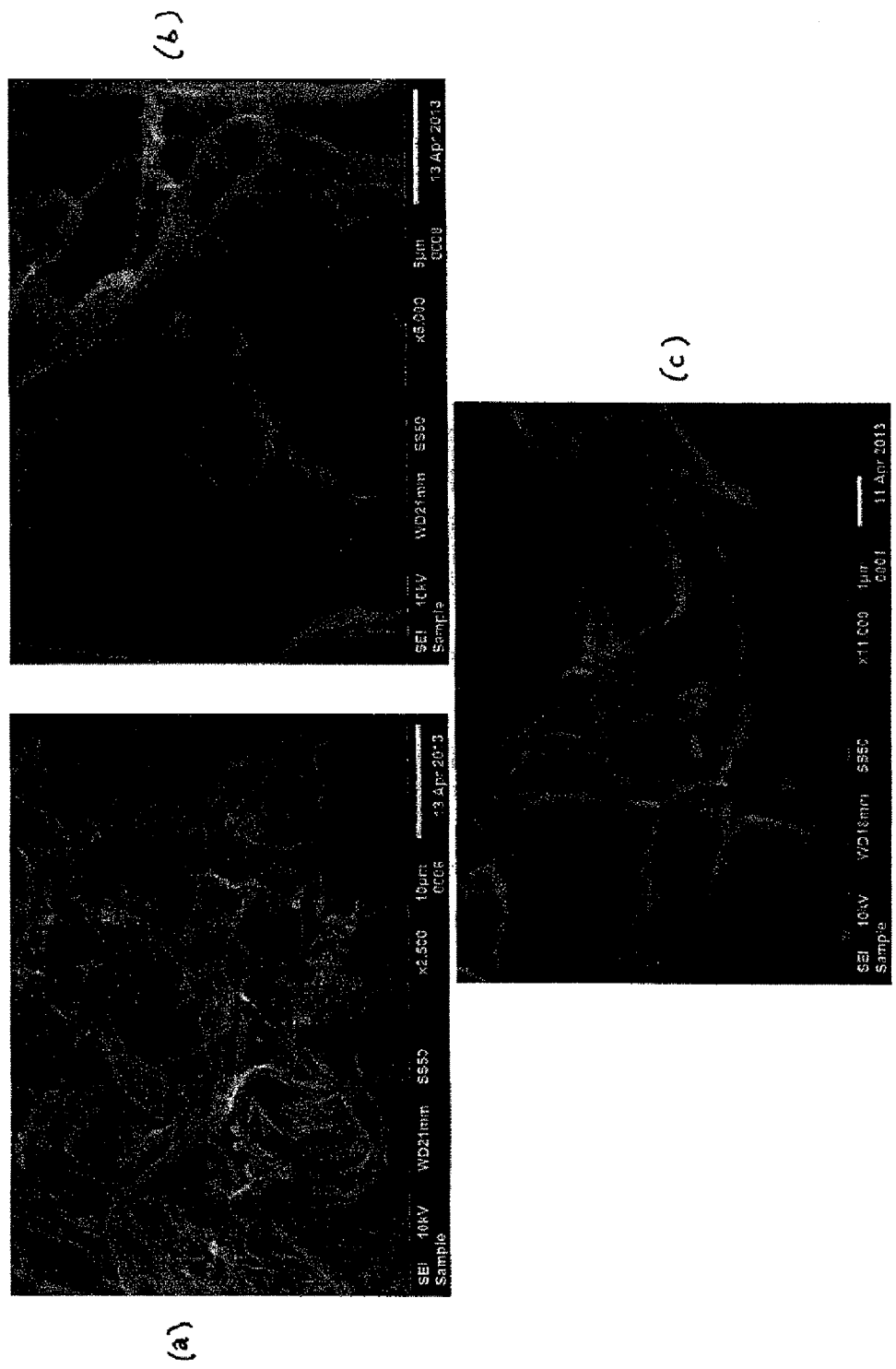
FIG. 13A is a SEM image of a PA6/PET fiber mixture following separation from a PS matrix at a magnification of 2500.
FIG. 13B is a SEM image of the PA6/PET fiber mixture of FIG. 13A following separation from a PS matrix at a magnification of 5000.
FIG. 13C is a SEM image of the PA6/PET fiber mixture of FIG. 13A following separation from a PS matrix at a magnification of 11000.

Referring to FIG. 11, x-ray patterns were obtained before and after orientation and illustrate highly oriented PA6 fibers and PET fibers embedded in a PS matrix. The tensile properties of the structure were tested before and after orientation, with the results being shown in FIG. 12. Orienting the PA6/PET fiber mixture increases the Young's Modulus of the PA6/PET fiber mixture to levels between about 300 MPa to about 3.5 GPa. The graph of FIG. 12 shows that the Young's Modulus increased from 220 MPA to about 3.2 GPa by orienting the PA6/PET fiber mixture. Accordingly, by orienting the nano-fibers, the mechanical properties were largely improved, which facilitates the potential for applications such as membranes and scaffolds.

Figure 14:
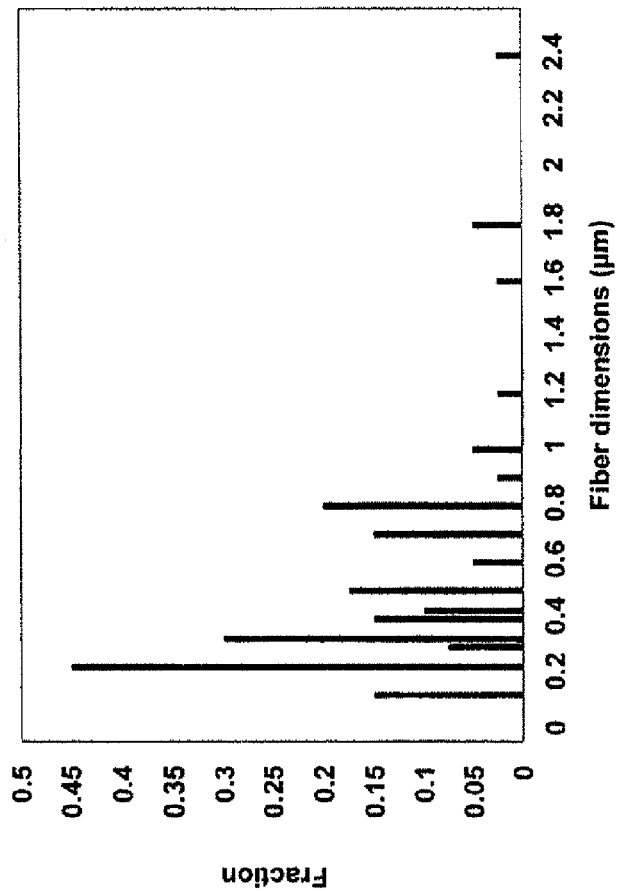
FIG. 14 is a graphical illustration relating fiber width and thickness to the fiber fraction, by volume, in the PA6/PET fiber.

The opposing ends of the structure were fixed and jets applied high pressure water to the structure to separate the PA6 layers and PET layers from the PS matrix. More specifically, water having a temperature of 40° C. was applied to the structure for 30 minutes at a pressure of about 1000 psi, which removed the interfaces between the PA6 layers, the PET layers, and the PS layers. The PS layers were discarded, leaving behind only rectangular PA6 fibers and rectangular PET fibers. The final cross-sectional dimensions of the rectangular PA6 and PET fibers are about 0.1 µm to about 0.4 µm in the thickness or z-direction and about 0.3 µm to about 2.4 µm in the width or x-direction. SEM images of the PA6/PET nano-fiber mixture are shown in FIGS. 13A-13C. FIG. 14 shows the fiber size distribution.

The preferred embodiments of the invention have been illustrated and described in detail. However, the present invention is not to be considered limited to the precise construction disclosed. Various adaptations, modifications and uses of the invention may occur to those skilled in the art to which the invention relates and the intention is to cover hereby all such adaptations, modifications, and uses which fall within the spirit or scope of the appended claims.

Having described the invention, the following is claimed:

1. A multilayered polymer composite film comprising:
a first polymer material forming a polymer matrix; and
a second polymer material coextruded with the first polymer material and forming a plurality of fibers embedded within the polymer matrix, the fibers having a rectangular cross-section and extending the entire length of the multilayered polymer composite film, a planar layer interface being defined between each fiber and the polymer matrix; and
a pair of polymer skin layers provided on opposite sides of the fibers and the polymer matrix such that the layer interfaces are positioned between the pair of polymer skin layers.

2. The multilayered polymer composite film of claim 1, wherein the first polymer material comprises polycaprolactone and the second polymer material comprises polyethylene oxide.

3. The multilayered polymer composite film of claim 1, wherein the fibers have a Young's Modulus from about 300 MPa to about 3.2 GPa.

4. The multilayered polymer composite film of claim 1 further comprising a third polymer material coextruded with the first polymer material and the second polymer material and forming a second plurality of fibers embedded within the polymer matrix, the second plurality of fibers having a rectangular cross-section and extending the entire length of the multilayered polymer composite film.

5. The multilayered polymer composite film of claim 4, wherein the first polymer material comprises polystyrene, the second polymer material comprises polyamide 6, and the third polymer material comprises poly(ethylene terephthalate).

6. The multilayered polymer composite film of claim 1, wherein the fibers are axially oriented within the polymer matrix.

7. The multilayered polymer composite film of claim 1, wherein the first polymer material and the second polymer material are substantially immiscible.

8. The multilayered polymer composite film of claim 1, wherein each of the plurality of fibers has the same rectangular cross-section.

9. The multilayered polymer composite film of claim 1, wherein the cross-section of each fiber is the same along the entire length of the fiber.

10. The multilayered polymer composite film of claim 1, wherein the first polymer material and the second polymer material both have rectangular cross-sections prior to coextrusion.

11. The multilayered polymer composite film of claim 1, wherein each planar interface extends over the entire thickness of the matrix.

12. A method for producing polymer fibers comprising:
coextruding a first polymer material with a second polymer material to form a coextruded polymer film having discrete overlapping layers of polymeric material that each extend the entire length of the coextruded polymer film;
multiplying the overlapping layers by dividing the coextruded polymer film into portions and stacking the portions to form a multilayered composite film; and
separating the first polymer material from the second polymer material to form a plurality of first polymer material fibers having a rectangular cross-section.

13. The method of claim 12, wherein separating the first polymer material from the second polymer material comprises immersing the multilayered composite film in a solvent to dissolve one of the first polymer material or the second polymer material.

14. The method of claim 12, wherein solvent comprises water, the first polymer material being water soluble and the second polymer material being water insoluble.

15. The method of claim 12, wherein the first polymer material comprises polycaprolactone and the second polymer material comprises polyethylene oxide.

16. The method of claim 12, wherein separating the first polymer material from the second polymer material comprises applying pressurized water to the multilayered composite film.

17. The method of claim 12 further comprising axially orienting the multilayered composite film in at least one direction.

18. The method of claim 12, wherein the first polymer material and the second polymer material are substantially immiscible.

19. The method of claim 12, wherein separating the first polymer material from the second polymer material forms a plurality of first polymer material fibers having the same rectangular cross-section.

20. The method of claim 12, wherein separating the first polymer material from the second polymer material forms a plurality of first polymer material fibers that each has a cross-section that is the same along the entire length of the fiber.

21. The method of claim 12, wherein the first polymer material and the second polymer material both have rectangular cross-sections coextruded to form the coextruded polymer film.

22. A method for producing polymer fibers comprising:
coextruding a first polymer material with a second polymer material to form a coextruded polymer film having discrete overlapping layers of polymeric material that each extends the entire length of the coextruded polymer film;
multiplying the overlapping layers to form a multilayered composite film;
separating the first polymer material from the second polymer material to form a plurality of first polymer material fibers having a rectangular cross-section; and
coextruding a third polymer material with the first polymer material and the second polymer material and separating the third polymer material from the first and second polymer materials to form a second plurality of fibers having a rectangular cross-section.

23. The method of claim 22, wherein the first polymer material comprises polystyrene, the second polymer material comprises polyamide 6, and the third polymer material comprises poly(ethylene terephthalate).

24. A fiber produced from a composite stream comprised of discrete overlapping layers of polymeric material, a pair of such discrete overlapping layers define a generally planar layer interface therebetween which lies generally in an x-y plane of an x-y-z coordinate system, wherein the y-axis extends in the general direction of flow of the first composite stream, the x-axis extends transversely of the first composite stream and defines a transverse dimension of the layer interface, and the z-axis extends perpendicularly away from the planar layer interface in the thickness direction of the pair of discrete overlapping layers, the fiber comprising:
a polymeric material extending longitudinally along the y-axis and having a rectangular cross-section of about 0.1 µm to about 0.4 µm along the z-axis and about 0.3 µm to about 2.4 µm along the x-axis, the cross-section of the polymeric material being the same along its entire length.

25. The fiber recited in claim 24, wherein the polymeric material comprises one of PCL, PEO, PA6, and PET.

26. The fiber recited in claim 24, wherein the polymeric material has a Young's Modulus from about 300 Mpa to about 3.2 Gpa.

27. The fiber recited in claim 24, wherein the polymeric material has the same cross-section along its entire length.

* * * * *

UNITED STATES PATENT AND TRADEMARK OFFICE
CERTIFICATE OF CORRECTION

PATENT NO. : 10,077,509 B2
APPLICATION NO. : 14/394234
DATED : September 18, 2018
INVENTOR(S) : Eric Baer et al.

It is certified that error appears in the above-identified patent and that said Letters Patent is hereby corrected as shown below:

In the Specification

In Column 1, after Line 10 insert:
--GOVERNMENT FUNDING
This invention was made with government support under the grant DMR-0423914 awarded by The National Science Foundation. The United States government has certain rights in the invention.--

Signed and Sealed this
Twelfth Day of February, 2019

Andrei Iancu
*Director of the United States Patent and Trademark Office*